UNITED STATES PATENT OFFICE.

CHARLES F. WALLACE, OF TOMPKINSVILLE, AND MARTIN F. TIERNAN, OF JAMAICA, NEW YORK.

VALVE-PACKING.

1,283,994.

Specification of Letters Patent. Patented Nov. 5, 1918.

No Drawing. Application filed August 28, 1918. Serial No. 251,845.

*To all whom it may concern:*

Be it known that we, CHARLES F. WALLACE and MARTIN F. TIERNAN, citizens of the United States, residing at Tompkinsville, borough of Richmond, city and State of New York, and Jamaica, county of Queens, State of New York, respectively, have invented certain new and useful Improvements in Valve-Packing, of which the following is a full, clear, and exact description.

In certain kinds of apparatus, notably such as is used in treating fluids by chlorin, or analogous purposes, the problem of packing for certain parts such as valves or valve stems is a serious one, for the reason that such packing must be fully capable of resisting the destructive effects thereon of the chlorin, and at the same time possess all the other properties which are required of it under such circumstances and conditions of use. This example will serve as typical of the required nature and purpose of the new packing material which constitutes the subject of this application.

This improved packing is composed essentially of asbestos, bees-wax and graphite and to produce it we follow the following process:

We first dissolve a quantity of bees-wax in a suitable menstruum such as carbon tetra chlorid and immerse in the solution asbestos strings or ropes until the latter are fully saturated. We then incorporate with the asbestos as thoroughly as possible graphite flakes or powder, by agitating the rope therein, by rubbing or otherwise. When this has been done, the ropes are generally hung up and exposed to the air until the volatile solvent has evaporated which leaves the asbestos coated with wax to which the graphite adheres.

This material is then wound about the stem of a valve or used in any way that ordinary packing material is employed, and is most effective and desirable. None of its constituent parts is liable to attack by chlorin or other like agents, while it possesses highly lubricating and other properties desirable in such materials.

We believe the ingredients named above are the best and perhaps the only ones suitable for the purpose, but this is largely a matter of test in order to find elements having the same properties and functions. For example, instead of bees-wax, other substances that resist the action of chlorin and which may be caused to impregnate, when dissolved by a volatile solvent, a non-destructible fiber such as asbestos, and which will hold by their adhesive properties a sufficient quantity of graphite or similar lubricant, may be used.

The specific steps of the process set forth may also be varied, the essential thing being to impregnate the fiber with a substance of the kind described to which the graphite will adhere when it has been well rubbed in.

What we, therefore, claim is:

1. A packing composed of asbestos impregnated with bees-wax to which graphite in a finely divided condition adheres.

2. A packing material composed of asbestos strings or ropes impregnated with a material inert to chlorin and soluble in a volatile solvent and associated with graphite in a finely divided form adhering thereto.

3. The process of making a packing material herein described which consists in dissolving bees-wax with a volatile solvent, impregnating asbestos rope with the solution, rubbing finely divided graphite into the rope and then allowing the solvent to evaporate off.

In testimony whereof we hereunto affix our signatures.

CHARLES F. WALLACE.
MARTIN F. TIERNAN.